United States Patent [19]
Kloster

[11] 4,256,421
[45] Mar. 17, 1981

[54] SELF-THREADING NUT

[76] Inventor: Kenneth D. Kloster, 6649 Millridge, Maumee, Ohio 43537

[21] Appl. No.: 86,785

[22] Filed: Oct. 22, 1979

[51] Int. Cl.[3] .............. B23B 51/00; B23G 5/00; F16B 27/00
[52] U.S. Cl. .............. 408/221; 10/86 C; 10/111; 408/205; 411/437
[58] Field of Search .............. 408/84, 97, 207, 216, 408/219, 221, 239, 205; 10/86 C, 1 R, 1 B, 111; 85/32 V

[56] References Cited
U.S. PATENT DOCUMENTS

| | | | |
|---|---|---|---|
| 689,555 | 12/1901 | Mann | 10/111 |
| 1,096,876 | 5/1914 | Welch | 408/216 |
| 1,588,606 | 6/1926 | Oden | 10/111 |
| 1,699,439 | 1/1929 | Moritsky | 408/221 |
| 1,803,888 | 5/1931 | Basola et al. | 408/187 |
| 2,723,584 | 11/1955 | Parker | 85/32 V |
| 3,326,260 | 6/1967 | Tucker | 85/32 V |
| 3,715,168 | 2/1973 | Kuhn | 408/239 |

Primary Examiner—Harrison L. Hinson
Attorney, Agent, or Firm—Wilson, Fraser, Barker & Clemens

[57] ABSTRACT

This invention relates to a self-threading nut which is utilized to hold a replacement shock absorber within the cylinder housing of a vehicular suspension system commonly referred to as a MacPherson strut suspension system. The nut includes a generally cylindrical main body portion having a tapered threaded portion on the inner wall thereof. A plurality of apertures are formed in the side wall of the main body portion to provide positive lead angle cutting edges and permit the removal of metal chips therefrom. The lower end of the nut is formed with an inner diameter corresponding to the outer diameter of the cylinder, and the upper end wall includes a plastic bushing having an inner diameter corresponding to the diameter of the piston rod of the replacement shock absorber. The inner diameter of the lower end and the plastic bushing cooperate to center the nut as threads are formed on the outer wall of the cylinder.

8 Claims, 5 Drawing Figures

SELF-THREADING NUT

BACKGROUND OF THE INVENTION

One type of vehicle suspension system which is becoming increasingly popular is the MacPherson strut suspension system. The MacPherson strut is an integral coil spring-shock absorber assembly which provides a lightweight, compact vehicle suspension system. The MacPherson strut suspension system is disclosed in more detail in U.S. Pat. No. 2,624,592 to E. S. MacPherson.

One of the problems associated with MacPherson strut assemblies is that the shock absorber unit typically wears out before the associated coil spring. One solution to this problem is to manufacture the MacPherson strut assembly with a construction which permits the shock absorber to be readily removed and replaced with a new shock absorber. However, this type of construction results in additional manufacturing expense. Consequently, some manufacturers produce MacPherson strut assemblies which do not readily accept replacement shock absorbers. In this type of assembly, the original equipment shock absorber unit is inserted into an associated cylinder housing which is subsequently sealed by welding or roll forming. The cylinder housing typically includes a coil spring support and a lower support bracket. Thus, when the shock absorber unit wears out, the vehicle owner is faced with the expense of replacing the entire cylinder housing assembly, including the coil spring support and the lower support bracket.

SUMMARY OF THE INVENTION

The present invention relates to a self-threading nut which is utilized to hold a replacement shock absorber within the cylinder housing of a MacPherson strut suspension system. If the original shock absorber of the MacPherson strut is factory-sealed within the cylinder housing, the upper end of the cylinder must first be severed to provide access to the original shock absorber. After the upper end of the cylinder is severed, the worn shock absorber can be removed and replaced with a new shock absorber. The self-threading nut can then be used as a permanent retainer to hold the replacement shock absorber in the cylinder, or the nut may be used as a tool for forming threads on the outer wall of the cylinder. If the nut is used as a threading cutting tool, a separate retaining nut can then be connected to the top of the newly threaded cylinder.

Accordingly, it is an object of the present invention to produce a device which permits a factory-sealed cylinder in a MacPherson strut assembly to retain a replacement shock absorber.

It is another object of the present invention to produce a device for holding a replacement shock absorber within the cylinder housing of a MacPherson strut suspension system.

It is a further object of the present invention to produce a device for forming threads in the outer wall of a cylinder housing of a MacPherson strut suspension system.

The above and other objects of the invention may be typically achieved by a thread forming apparatus comprising a main body including a hollow portion having thread forming means on the inner annular wall of the hollow portion terminating in an annular skirt portion for receiving the upper end of the cylinder having threads formed thereon. The main body also includes an upper annular centering means formed therein for receiving the piston rod of the shock absorber. The centering means has an inner diameter substantially equal to the outer diameter of the piston rod for centering the apparatus as the same is rotated onto the cylinder during the thread forming operation.

BRIEF DESCRIPTION OF THE DRAWINGS

The above, as well as other objects and advantages of the invention will become readily apparent to one skilled in the art from reading the following detailed description of the invention when considered in light of the accompanying drawings in which.

DESCRIPTION OF THE PREFERRED EMBODIMENT

Figure 1:
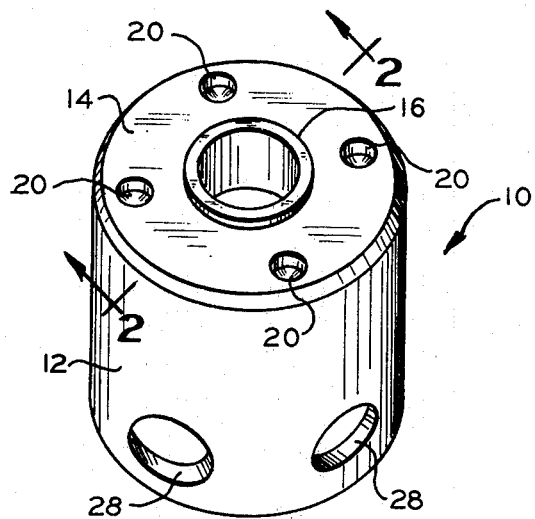
FIG. 1 is a top perspective view of a self-threading nut embodying the features of the present invention.
Figure 2:
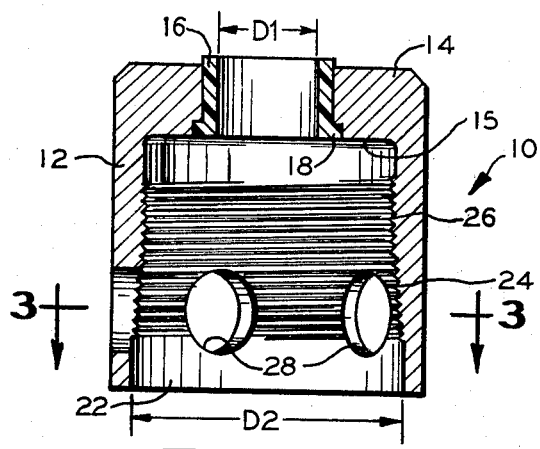
FIG. 2 is a sectional view taken along the line 2—2 of FIG. 1.
Figure 3:
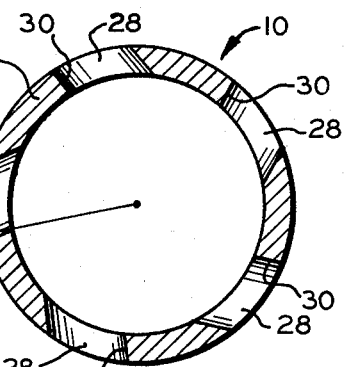
FIG. 3 is a sectional view taken along the line 3—3 of FIG. 2.

Referring to FIGS. 1 through 3, there is shown a self-threading nut 10 embodying the features of the present invention. The nut 10 is utilized to hold a replacement shock absorber within the cylinder of a MacPherson strut suspension system. As will be discussed, the nut 10 may be used as a permanent retainer, or may be used as a tool for forming threads on the outer wall of the cylinder.

The self-threading nut 10 includes a generally cylindrical main body portion 12. A top wall 14 having a lower surface 15 is attached to the upper end of the main body portion 12. The top wall 14 has a centrally located aperture formed therein for receiving an annular bushing 16. The bushing 16 is typically constructed of a plastic material, and has an outwardly extending lip 18 which is received within an annular groove formed at the inner end of the aperture and functions to hold the bushing within the top wall 16. As shown in FIG. 2, the inner diameter of the bushing 16 has a diameter D1. As will be discussed, the diameter D1 corresponds to the diameter of the piston rod which is inserted into the bushing 16.

The top wall 16 has a plurality of recesses 20 formed therein for receiving downwardly extending projections of a suitable tool (not shown) which can be utilized to rotate the nut after the nut has been positioned on top of the cylinder.

The inner wall of the main body portion 12 has a lower annular skirt portion 22 formed therein having a diameter D2, as indicated in FIG. 2. As will be discussed, the diameter D2 corresponds to the outer diameter of the cylinder over which the nut 10 is to be threaded.

The inner wall of the main body portion 12 has an intermediate tapered threaded portion 24 which extends into an upper uniform threaded portion 26. The main body portion 12 has a plurality of horizontally aligned apertures 28 formed in the side wall thereof. The horizontal location of the apertures 28 generally corresponds to the location of the tapered threaded portion 24.

As is clearly illustrated in FIG. 3, the apertures 28 are each formed with a cutting edge 30. The surface of each cutting edge 30 forms a positive lead angle A with respect to an imaginary radial reference line extending through the tip of the cutting edge 30. The positive lead angle A improves the cutting efficiency as the nut 10 is rotated in a clockwise direction onto the MacPherson strut cylinder.

Figure 4:
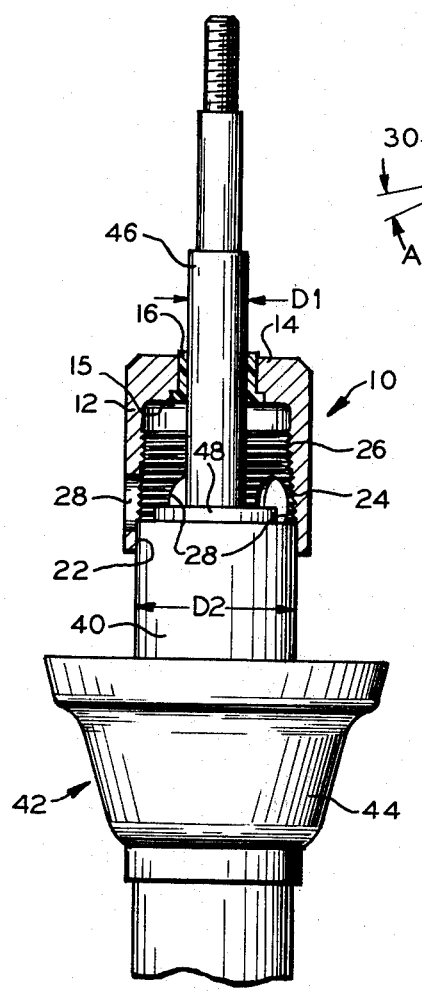
FIG. 4 is a side sectional view similar to FIG. 2 but showing the self-threading nut positioned on the upper end of a cylinder in a MacPherson strut suspension system.
Figure 5:
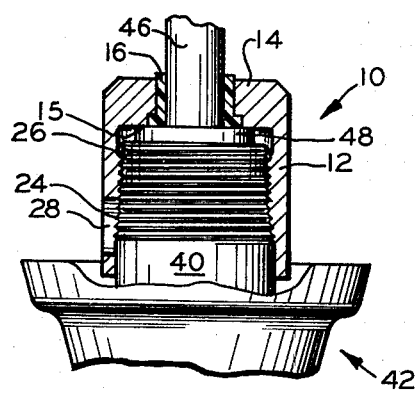
FIG. 5 is a side view similar to FIG. 4 but showing the self-threading nut fully threaded onto the cylinder of the MacPherson strut.

FIGS. 4 and 5 illustrate the operation of the self-threading nut 10 as it is placed on a cylinder 40 of a MacPherson strut 42 and then rotated onto the cylinder. The MacPherson strut 42 shown in FIGS. 4 and 5 has been partially disassembled by removing a coil spring (not shown) which was supported by a coil spring support 44 welded to the cylinder 40. A tool which can be utilized to remove the coil spring is disclosed in U.S. Pat. No. 4,034,960 to K. D. Kloster. A piston rod 46 of a replacement shock absorber 48 extends axially from the top of the cylinder 40.

Before the replacement shock absorber can be placed within the cylinder 40, the original worn shock absorber must be removed therefrom. In instances where the original shock absorber has been factory-sealed within the cylinder by welding or roll forming, the upper end of the cylinder must be severed to provide access to the original shock absorber. A tool which can be utilized to sever the upper end of the cylinder is disclosed in U.S. patent application Ser. No. 86,784 filed Oct. 22, 1979. After the upper end of the cylinder is severed, the worn shock absorber can be removed and replaced with a new shock absorber.

After the replacement shock absorber is inserted into the cylinder 40, the self-threading nut 10 is placed on top of the cylinder as shown in FIG. 4. As previously mentioned, the diameter D1 of the piston rod 46 is substantially equal to the inner diameter of the bushing 16, while the outer diameter D2 of the cylinder 40 is substantially equal to the inner diameter of the lower annular skirt portion 22. The relatively close fit between piston rod 46 and the bushing 16 function as a centering means for ensuring that the threads are properly formed on the cylinder when the nut is rotated. Similarly, the relatively close fit between the cylinder 40 and the lower annular skirt portion 22 cooperate to center the nut 10 as it is rotated onto the cylinder 40 and thereby produce the desired alignment between the nut 10 and the associated piston rod of the replacement shock absorber.

As the nut 10 is rotated, the cutting edges 30 of the apertures 28 form threads on the outer wall of the cylinder. Metal chips which have been cut from the cylinder are guided away from the cylinder through the apertures 28. When the nut is fully threaded onto the cylinder 40, as shown in FIG. 5, the top edge of the replacement shock absorber 48 abuts the lower surface 15 of the top wall 14.

As previously mentioned, the nut 10 may be used as a permanent retainer, or may be used as a tool for forming threads on the outer wall of the cylinder. If the nut 10 is used as a thread cutting tool, the nut is removed after the threads have been formed. A retaining nut (not shown) having internally formed threads can then be connected to the newly formed threaded portion of the cylinder.

If it is desired to use the nut 10 as a permanent retainer, the nut is typically constructed from lower cost type steel such as 1040 or 1050 steel, for example. On the other hand, if the nut 10 is to be used as a tool for repeatedly forming threads on the cylinder, the nut is typically constructed from a high quality tool steel such as 6150 steel, for example, to assure the necessary extended duty cycle.

In accordance with the provisions of the patent statutes, the principle and mode of operation of the invention have been explained in what is considered to represent its best embodiment. It should, however, be understood that the invention may be practiced otherwise than as specifically illustrated and described without departing from its spirit or scope in accordance with the attached claims.

What I claim is:

1. An apparatus for forming threads on the upper end of a cylinder of a shock absorber assembly having a piston rod axially extending from the upper end of the cylinder, said apparatus comprising: a main body including a hollow portion having thread forming means on the inner annular wall of the hollow portion terminating in an annular skirt portion for receiving the upper end of the cylinder having threads formed thereon, and an upper annular centering means formed in said main body for receiving the piston rod of the shock absorber, said centering means having an inner diameter substantially equal to the outer diameter of the piston rod for centering the apparatus as the same is rotated onto the cylinder during the thread forming operation.

2. An apparatus according to claim 1 wherein said annular skirt portion has an inner diameter substantially equal to the outer diameter of the upper end of the cylinder.

3. An apparatus according to claim 1 wherein said thread forming means includes at least one aperture having a cutting edge formed in the wall of said main body.

4. An apparatus according to claim 3 wherein said cutting edge forms a positive lead angle cutting edge.

5. An apparatus according to claim 1 wherein said thread forming means on the inner annular wall of the hollow portion includes tapered threads terminating inwardly in an array of threads having a uniform diameter and terminating outwardly in said annular skirt portion.

6. An apparatus according to claim 1 wherein said upper annular centering means includes a bushing.

7. An apparatus according to claim 6 wherein said bushing is formed of a plastic material.

8. An apparatus according to claim 1 wherein said main body includes means for receiving an actuating tool for rotating the apparatus onto an associated cylinder.

* * * * *